US011068195B2

United States Patent
Moon

(10) Patent No.: US 11,068,195 B2
(45) Date of Patent: Jul. 20, 2021

(54) SYSTEMS AND METHODS OF DISTRIBUTED BACKUP AND RECOVERY ON A PRIVATE NETWORK

(71) Applicant: Whitestar Communications, Inc., Apex, NC (US)

(72) Inventor: Billy Gayle Moon, Apex, NC (US)

(73) Assignee: Whitestar Communications, Inc., Apex, NC (US)

( * ) Notice: Subject to any disclaimer, the term of this patent is extended or adjusted under 35 U.S.C. 154(b) by 0 days.

(21) Appl. No.: 16/518,680

(22) Filed: Jul. 22, 2019

(65) Prior Publication Data

US 2021/0026535 A1    Jan. 28, 2021

(51) Int. Cl.
*G06F 3/06* (2006.01)
*H04L 29/06* (2006.01)

(52) U.S. Cl.
CPC .............. *G06F 3/065* (2013.01); *G06F 3/067* (2013.01); *G06F 3/0622* (2013.01); *H04L 63/102* (2013.01); *H04L 63/18* (2013.01)

(58) Field of Classification Search
CPC .......... G06F 3/06; G06F 3/065; G06F 3/0622; G06F 3/067; H04L 63/102; G04L 63/18
USPC ....................................................... 711/162
See application file for complete search history.

(56) References Cited

U.S. PATENT DOCUMENTS

| | | | |
|---|---|---|---|
| 8,490,176 B2 * | 7/2013 | Book | H04M 3/42161 726/17 |
| 9,990,511 B1 * | 6/2018 | Dreyfus | G06F 21/57 |
| 2001/0034737 A1 | 10/2001 | Cane et al. | |
| 2003/0172291 A1 | 9/2003 | Judge et al. | |
| 2005/0131990 A1 | 1/2005 | Jewell | |
| 2006/0271601 A1 * | 11/2006 | Fatula, Jr. | G06F 11/1464 |
| 2008/0086658 A1 | 4/2008 | Takahasi | |
| 2008/0307017 A1 | 12/2008 | Lyons et al. | |
| 2011/0276685 A1 * | 11/2011 | de Waal | G06F 9/5072 709/224 |
| 2013/0054535 A1 * | 2/2013 | Ledoux | G06F 8/61 707/654 |
| 2013/0110969 A1 | 5/2013 | Wertheimer et al. | |
| 2013/0173553 A1 * | 7/2013 | Apte | G06F 11/1453 707/640 |

(Continued)

OTHER PUBLICATIONS

Dissenter, Frequently Asked Questions at https://dissenter.com/help/faq, Apr. 16, 2017.

(Continued)

*Primary Examiner* — Christopher B Shin
(74) *Attorney, Agent, or Firm* — Devlin Law Firm LLC; Deepali Brahmbhatt

(57) ABSTRACT

The systems and methods of distributed backup on a private network, comprising: establishing a secure and encrypted private network with one or more profile computing devices; establishing a whitelist of trusted profiles on a first profile computing device; selecting two or more profiles from the whitelist to backup information from the first profile computing device; tracking any updates to the network address of the selected profiles for backup; tracking information on remote profile computing devices that originated from the first profile computing device; sending differential information for backup that does not exist on other remote profile computing devices to the selected profile computing devices.

20 Claims, 8 Drawing Sheets

(56) References Cited

U.S. PATENT DOCUMENTS

| | | | |
|---|---|---|---|
| 2014/0289333 A1* | 9/2014 | Chan | A63F 13/73 |
| | | | 709/204 |
| 2014/0368601 A1* | 12/2014 | deCharms | H04L 65/403 |
| | | | 348/14.02 |
| 2015/0304484 A1* | 10/2015 | Halmstad | H04W 48/02 |
| | | | 455/419 |
| 2016/0057020 A1* | 2/2016 | Halmstad | H04L 67/26 |
| | | | 715/740 |
| 2019/0141095 A1* | 5/2019 | John | H04L 63/0807 |

OTHER PUBLICATIONS https://www.web2pdfconvert.com/, 2018.
https://www.codester.com/items/13206/web2pdf-ios-source-code, 2018.
Zeroisation at https://en.wikipedia.org/wiki/Zeroisation, 2018.
IBM Az/OS Cryptographic Services, Integrated Cryptographic Service Facility, Application Programmer's Guide, p. 50, 2011.
FIPS PUB 140-2, May 25, 2001.
DIBS at https://github.com/emin63/dibs, 2014.
https://github.com/bernardobelchior/distributed-backup-service.
https://github.com/afonsocastro96/SDIS-Project2, 2016.
https://sourceforge.net/projects/p2pbackupsmile/, 2010.
http://www.infostor.com/nas/58-top-open-source-storage-project-1.html, Dec. 26, 2013.
CDN disclosed at https://en.wikipedia.org/wiki/Content_delivery_network, 2015.
BitTorrent Speed to Strengthen BitTorrent Protocol, Connect users with (BTT) tokens, McBrown, Jan. 17, 2019 at http://blog.bittorrent.com/2019/01/17/bittorrent-speed-to-strengthen-bittorrent-protocol-connect-users-with-btt-tokens/.

* cited by examiner

SYSTEMS AND METHODS OF DISTRIBUTED BACKUP AND RECOVERY ON A PRIVATE NETWORK

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The following Whitestar Communications, Inc.'s concurrently filed patent applications are incorporated herein by reference: (1), titled "SYSTEMS AND METHODS OF SALUTATION PROTOCOL TO COMMUNICATE USING A PRIVATE OVERLAY PEER TO PEER NETWORK." and patent application Ser. No. 16/518,292; (2), titled "SYSTEMS AND METHODS OF SECURING DIGITAL CONVERSATIONS FOR ITS LIFE CYCLE AT SOURCE, DURING TRANSIT AND AT DESTINATION" and patent application Ser. No. 16/518,406; (3), titled "SYSTEMS AND METHODS OF COLLABORATIVE APPLICATION ON A PRIVATE NETWORK" and patent application Ser. No. 16/518,491; (4), titled "SYSTEMS AND METHODS OF ENFORCING COMMUNICATIONS SEMANTICS ON A PRIVATE NETWORK" and patent application Ser. No. 16/518,538; (5), titled "SYSTEMS AND METHODS OF GESTURE TRIGGERED AUTOMATIC ERASURE ON A PRIVATE NETWORK" and patent application Ser. No. 16/518,586; and (6), titled "SYSTEMS AND METHODS OF DELEGATION OR REPLICATION ON A PRIVATE NETWORK."

FIELD OF THE INVENTION

The present invention is in the technical field of distributed backup and recovery within secure and encrypted private networks. More particularly, the present invention is in the technical field of automated and dynamic backup of data that stays fresh with backup buddy lists and network coverage. More particularly, the present invention is in the technical field of backup and dynamic recovery of all system information as well as user created content.

BACKGROUND

Current social media systems are enabled by central services provided by third parties. In essence, social media is interaction between two or more end-users that mirrors real-life situation where a third-party has no business interfering. But the digital world of the internet applications of social media do not align to the real-world frameworks.

Social media typically facilitates user-generated content including text, comments, photos, videos and voice. Traditionally these various media are generated through "online" interactions and are facilitated by one or more third party platforms such as Twitter, Facebook, Youtube, SnapChat, Instagram, Weibo, LinkedIn and many others.

In traditional social media systems, users create profiles via a service providers website or app and all the content is maintained, processed and stored by the social media company. In such systems, users rely on the social media companies to store and protect their sensitive user data both while in flight, i.e. in transit and at rest, i.e. either at source or destination.

While users don't pay "directly" for use of these services, the services providers generate revenue from its user content and meta data through directed ads and selling access to their subscribers content for data mining or harvesting. This revenue then offsets the cost of maintaining the centralized servers and data centers and in some cases returns dividends to their shareholders.

Unfortunately, there are a number of serious drawbacks to this architecture. Most notably is the broken business model that requires the service provider to monetize their customers, which in turn requires their customers to give some, if not all of their privacy.

Additionally, the service provides have recently gone into censorship or "de-platforming" of content based on their or their advertisers best interests and not necessary the interest of their users or user communities. In some cases the censorship is at the direction of a central government but in most cases it is carried out based on arbitrary decisions of the social media service provides.

Complicating the matter, should a competitor wish to enter the market to compete against the entrenched social media companies it takes tremendous capital to build out the data centers and facilities to onboard even a single user. As users join the new network, more resources must be added to the central networks to manage the traffic load and to store the content being created by their users. At the end of the day, the new social media company would once again have to monetize their customer base, solicit advertisers and adhere to government oversight. While the new company might impose a different set of censorship policies than the legacy companies its still censorship by a third party and not by end users.

Further, social media companies typically deploy simply one-way authentication and HTTPS to secure their user's data in flight. Many enterprise networks (as well as others) are able to put a "man in the middle" of such traffic using an HTTPS proxy, thus exposing all data in flight to the intermediary and allowing that intermediary to filter, read, copy and save user content without them being aware of it.

One-way authentication only authenticates or assures the user that when they connect to a sight that "claims to be" say instagram, that in fact it is instagram. The converse is not true. The cryptographic system does not authenticate the client software used by the user and therefore must trust higher level protocols to assure that a user that claims to be user A is in fact user A, for example through passwords or other means.

Both sets of "keys", the ones that attest to the service provider's identity and the passwords used by the "user" are not changed very often, and can actually not change for years. This means that if either key is broken, that all the user's or even sights' data can be exposed. Breaking the keys to access a sights meta data can expose all data of every user in the system. Breaking a given user's key can expose all of a user's stored content.

In summary, the current architecture of social media tends to lead to: (i) Third party censorship, sometimes legally, sometimes not; (ii) Lack of Privacy either on purpose or by accidental exposure; and (iii) Lack of free association.

The last point, lack of free association can best be understood by the fact that the social media companies can and do decide what user can and can not participate in their platform. Worse is that while excluding one user A from freely joining a given community and conversing with members of that community, the same platform may allow other members to make almost any claim about user A without allowing user A the ability to refute those claims. This leads to very bad social norms in which gangs of denizens roam from social media site to social media site spreading false or unsubstantiated claims about user A without user A being able to defend herself on any of those platforms.

Furthermore, because the user's content is held by a third party and the social media companies routinely change their terms of services, most users are unaware that their content may be retained or archived, indefinite. A frivolous statement which is deemed "social acceptable today" may be judged years into the future by a new set of standards and lead to harsh consequences including ability to get into schools and colleges, ability to get a job, ability to run for public office, etc. We call this effect "Future Guilt."

Still further problems exist in the semantics of existing social interactions on social media sites. When someone creates content, they don't "own" that content, the social media company does. Even with as simple as email, "ownership" of content is fluid and the semantics of "polite" conversation are not a part of the system.

For example, if user A creates an email message and sends it to user B and in that email, user A included content that she did not want to disclose to anyone else, there is nothing in the art that would prevent user B from saving that information away, copying it or forwarding it to someone else like user C. Neither is user B prevented from replying to user A and copying additional users D, E, etc. on that reply. This sort of "lack of control" of content is pervasive in today's social media systems and this leads to a lack of polite discourse amongst members of society.

Accordingly, in the existing solutions in the industry, backup and recovery is not an integrated part of the overall system and requires add-on efforts and certain amount of technical savvy personality to navigate and ensure that all digital data is secure. There is no smartness in backup software and recovery that dynamically updates based on changes in the network. To the extent solutions are available, they are targeted for enterprises with highly sensitive information and not to consumers.

DIBS—Distributed Internet Backup System (https://github.com/emin63/dibs) was created at MIT as a research project in 2014. This is now an abandoned project and only lives on as a reference project for several "block chain" based file backup systems. The DIBS system has the following feature description: "Since disk drives are cheap, backup should be cheap too. Of course it does not help to mirror your data by adding more disks to your own computer because a virus, fire, flood, robbery, power surge, etc. could still wipe out your local data center. Instead, you should give your files to peers (and in return store their files) so that if a catastrophe strikes your area, you can recover data from surviving peers. The Distributed Internet Backup System (DIBS) is designed to implement this vision."

DIBS may seem superficially de-centralized backup system but suffers from the following drawbacks. First, DIBS uses weak GPG cryptography using the same encrypted information for data in flight (transmission) and data at rest (stored locally on hard-drives or other storage). There's no authentication and attestation that the parties to who backed up information is shared are in fact trusted parties. DIBS focuses on using Reed-Solomon codes (known widely in the art) only to increase the integrity of the stored data to help improve recover and does not allow underlying hardware to provide it on a transaction based to focus on redundancy of information.

Furthermore, DIBS uses an empty passphrase for is signing/encryption which again is very weak by today's standards. Additionally, DIBS uses "email" address for the alias's of its public/private key pairs. This mechanism makes it impossible to simply re-key your system without having to re-backup everything that you have ever sent. Further weakening the system, DIBS stores all the key names in an unencrypted file. This is all acceptable as DIBS' main focus is on backup but does not providing for a secure peer to peer social network system seamless backup and recovery system.

Another key area where the systems differ is in how "peers" are added to the system. With DIBS, one manually enters peers into a list of devices where backups should be distributed. DIBS does not have "peers" selected form a user's list of "endpoints" which have been white listed as "trusted friends." Additionally, there is no mechanism for tracking the location of peers and dynamically updating the peer list. The address of peers in DIBS are fixed.

Since DIBS was first published, doing distributed backup projects based on its concepts and ideas has been a common software engineering project at the academic level, therefore many projects have been carrier out. The more notable include: https://github.com/bernardobelchior/distributed-backup-service; https://github.com/afonsocastro96/SDIS-Project2; https://sourceforge.net/projects/p2pbackupsmile/; http://www.infostor.com/nas/58-top-open-source-storage-project-thtml.

Note that all these systems have the same focus, which is to back and restore files amongst a group of computers that have been manually selected. Each utilize similar cryptography and have similar vulnerabilities.

SUMMARY OF THE INVENTION

The present invention is systems and methods of distributed backup on a private network, comprising: establishing a secure and encrypted private network with one or more profile computing devices; establishing a whitelist of trusted profiles on a first profile computing device;

selecting two or more profiles from the whitelist to backup information from the first profile computing device; tracking any updates to the network address of the selected profiles for backup; tracking information on remote profile computing devices that originated from the first profile computing device; sending differential information for backup that does not exist on other remote profile computing devices to the selected profile computing devices.

The systems and methods of distributed backup, further comprising: customizing the selected profiles for backup using one or more of the following: manually, based on available bandwidth or storage, or geographic location.

The systems and methods of distributed backup, further comprising: periodically updating the selected profiles for backup.

The systems and methods of distributed backup, further comprising: customizing the categories of information that is selected for backup.

The systems and methods of distributed backup, further comprising: selecting whitelists information for backup.

The systems and methods of distributed backup, further comprising: selecting profiles for backup using out of band factors including paying for storage services on another profile computing device.

The systems and methods of distributed backup, further comprising: customizing the number of profile computing devices selected for backup.

The systems and methods of distributed backup, further comprising: deleting all the secure objects on all profile computing devices on the private network other than the first profile computing device.

The systems and methods of distributed backup, further comprising: recovering partial information from one of the selected profile computing devices with backup information.

The systems and methods of distributed backup, further comprising: recovering all information for the first computing devices using one or more of the selected profile computing devices with backup information.

BRIEF DESCRIPTION OF THE DRAWINGS

The embodiments of this invention are illustrated by way of example and not limitation in the figures of the accompanying drawings, in which like references indicate similar elements and in which.

DETAILED DESCRIPTION OF THE INVENTION

Figure 1:
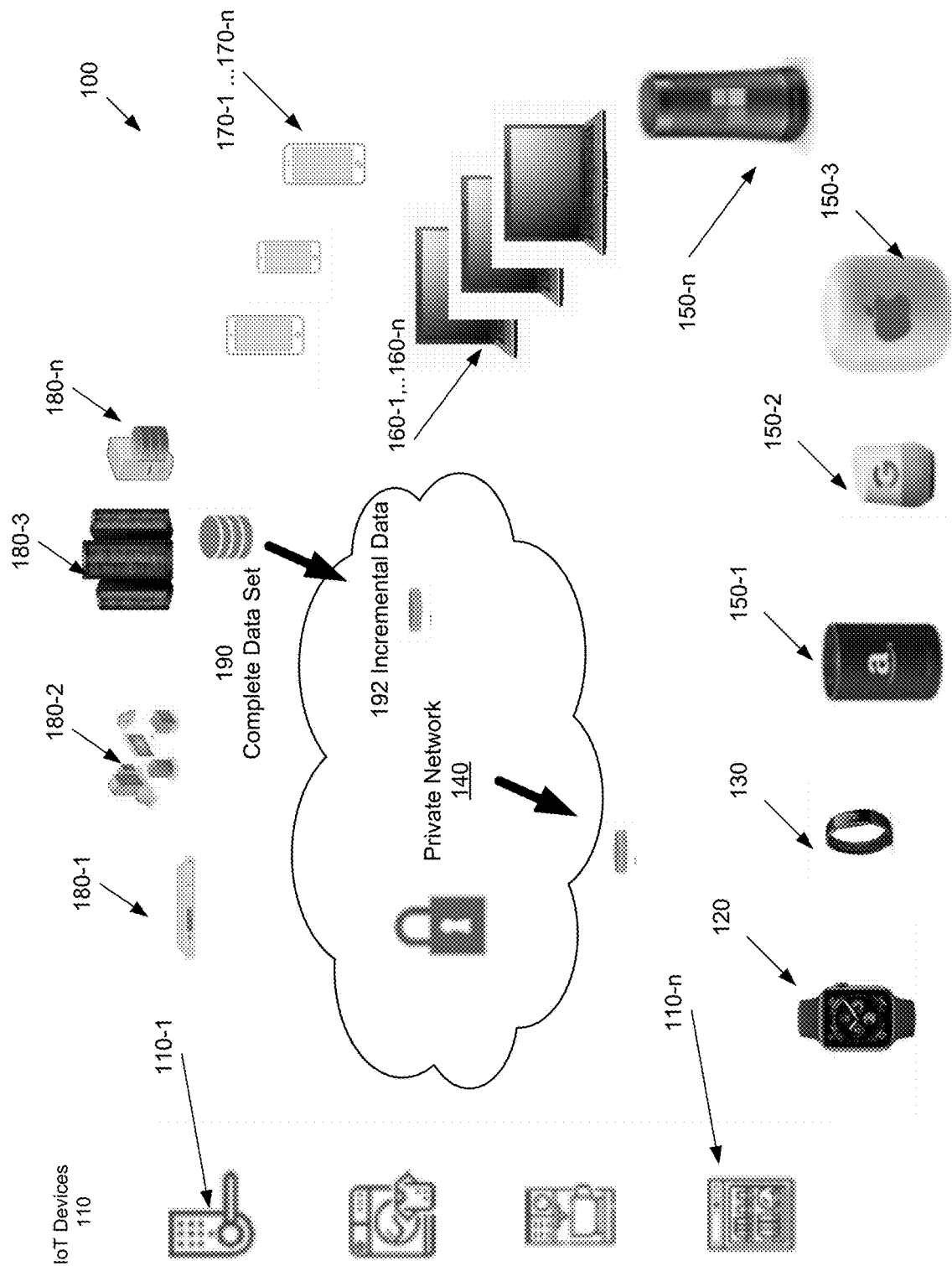
FIG. 1 shows a diagram illustrating an example of systems and methods systems and methods of systems and methods of distributed backup on a private network with different types and categories of computing devices including internet of things devices.

The systems and methods of distributed backup on a private network includes techniques to incorporate full and incremental backup of system information and user created content using trusted, attested and authenticated peer systems that stay fresh and are dynamically updated with network changes using existing cryptography algorithms to include redundancy of information within a secure private network. This can be subsequently used for automated or manual full or partial hassle-free recovery.

The systems and methods of distributed backup on a private network provides for a completely distributed social media platform that allows both humans and machines to freely associate with one another through an introduction and establish trust protocol. In this platform, there is no central service. There is no cost to stand up the platform. There are no additional costs as each new user joins the social network. Instead of a central services storing user content and facilitating user content distribution and user discovery, all these facilities are provided in a peer to peer social network by the users themselves.

No central authority can prevent the users from freely associating with one another or can exclude a given user from participation in social media with this system.

This invention discloses a novel means by which user data can be "backed up" within a social network and recovered with minimal overhead. Given that copies of almost all of a user's social media data has already been distributed to that user's social media network for the purposes of "sharing" that content, then only minimal additional information needs to be conveyed between members of a backup group to enable distributed recovery of that information.

In the first aspect, there are a number of core objects that include: Endpoints→which device a device or a person in the system. Conversations→which are created by a single endpoint and are used to contain a series of messages. Messages→which are a base unit for holding information to be shared by endpoints.

Endpoints objects contain, amongst other fields, the following: One or more addresses that the given endpoint will listen on for incoming packets. A public key that should be used to encrypt messages sent to the endpoint. The alias of the public key defined. A list of zero or more conversation references. Each conversation reference is a unique ID that can be formed without coordination from any other endpoint. An endpoint ID. Again, this id is unique without the need of coordination. When the endpoint was created. The time the endpoint was last modified. Some binary content that can be used by higher layers of the application to convey whatever information it wants. A lifecycle policy. A distribution policy.

Conversations objects contain, amongst other fields, the following: Default lifeCyclePolicy and default distributionPolicy for messages attached to the conversation. LifeCycle and Distribution policy for the conversation itself. An array of zero or more message contained within the conversation. An array of one or more endpoints participating in the conversation. A unique conversation ID. The ID of endpoint that owns the conversation. When the conversation was created. When the conversation was last updated. Optional binary content.

A message Object contains, amongst other fields, the following: An array of one ore more distribution and life cycle policies. Note the same message may be contained in more than one conversation and it therefore has more than one policy set associated with it. A unique message ID. An array of one or more conversation ID's, one for each conversation that the message is contained within. The endpoint ID of the owner of the message. When the message was created. When the message was last updated. Optional binary content.

Endpoints objects are exchanged between users using a novel introduction and establish trust protocol. The root items that a user must gain in order to recover data from a backup is the "set" of endpoints for which a given user is associated with.

In fact, a major advantage of the distributed backup system is that this is all the redundant information that is needed to recover all user data. The following describes how the system works.

First let's consider three users (endpoints) A, B and C. Each user selects some set of user's that he's associated with as a "backup set". So, for the is example, assume user A chooses to backup data only with user B. User B chooses to backup data with user A and also user C. In order to complete a "backup" then each user sends their endpoint object along with all of the endpoint objects of their peers to each user that that endpoint has in its backup set.

At the end of the protocol that establishes introduction and trust, this is the information each endpoint has about the other members of their social network: A→Has endpoint A (me), B and C's endpoint objects. B→Has endpoint A, B (me) and C's endpoint objects. C→Has endpoint A, B and C (me)'s endpoint objects.

After selecting backup sets, then a special backup protocol is used to send sets of endpoint information to each of the backup peers that each user also has: (i) A's Backup Store→set B[B,C]; (ii) B's Backup Store→set A[A,C], set C[C,A]; and (iii) C's Backup Store→set B[B,A].

What this means is that user B's device sent a set of endpoint objects for backup to A which contained B's own endpoint object along with C's endpoint object. Similarly, user A's device sent B a backup set containing endpoint A and endpoint C's objects and endpoint C sent endpoint B a backup set containing endpoint C and endpoint A's objects. Finally, endpoint B sent endpoint C a backup set containing endpoint B and endpoint A's objects.

Other configurations and optional sets could have also been selected by the users of the system. This configuration is just one of many. In this case, endpoint A can recover ALL the information he needs from his backup endpoint B. Endpoint B can recover all of his information from either endpoint A or endpoint C. Finally, endpoint C can recover his information from endpoint B.

To illustrate the recovery process, let us start by assuming endpoint A lost all his data. This could have happened for any number of reasons. So, endpoint A needs to recover his information and in his case, the only backup of information is endpoint B.

But, before beginning the process, endpoint A must create a new public/private key pair and alias to be used for the encrypting data in flight and at rest as disclosed elsewhere.

The recovery process starts by endpoint A sending a special out of band "recovery" message to endpoint B, for example using SMS, MMS, BLE, etc. In the preferred embodiment, endpoint A would send the message via a specially encoded text message to endpoint B's phone number. When endpoint B receives the recover request, it is up to user B to "decide" if the request really did come from endpoint A. Note that this could also be an automated process.

Embedded in the recovery request message is the current IP address by which endpoint B may send a reply along with a special password that endpoint A provides to assure that he is who he says he is and the new public key and alias that endpoint A generated.

Upon receiving this text message, endpoint B checks to see if he has stored in his backup sets a set for endpoint A. If so, he then further checks to see if that set's endpoint A object has the password that endpoint A sent in the recovery request. If this is true, then endpoint B's device would notify its user that endpoint A wishes to recover his data and ask permission to send it (again, this could be an automated process or it may require other intervention such as pressing a button.)

Should endpoint B's user accept the recovery request, then endpoint B sends a recovery message directly to endpoint A via the supplied IP address that endpoint A sent in the text message. This recovery message contains the "set" of endpoint objects that endpoint A had previously sent to endpoint B along with endpoint B's own endpoint object. So, in our example, endpoint A receives A, B and C's endpoint objects and further, endpoint A "knows" which of those objects is "his" as it is designated with a special "me" marker. This first message is sent from endpoint B to endpoint A is encrypted using the public key sent by endpoint A in the recovery request.

Upon receiving the set of endpoint objects, A saves those objects away as they represent the current information about all the counter parts endpoint A has in his social network.

Note that endpoint A updates his public key and alias contained within the received endpoint object to reflect his current key pair. Having done so, then A must distribute his new endpoint object back to each of his peers within his social network so that further communications are possible.

The next step of the recovery process is for endpoint A to recover all of the conversations and associated messages that he was a party to within his social network.

This feat can be accomplished by simply traversing the object trees rooted in each of the endpoint objects that have now been recovered.

Endpoint A starts the process by declaring an empty hash where each key is a conversation ID and each value is an endpoint ID. That would be, Hash<ConversationID, EndpointID>.

For each endpoint object, endpoint A examines the endpoint object and extracts the list of conversation IDs. For each conversation ID, endpoint A determines if that ID is not currently in the hash. If it is not, then endpoint A adds the endpoint ID of the endpoint object he's currently enumerating as the value and the conversation ID as the key to the hash of all conversations. Endpoint A repeats this process with each endpoint object until Endpoint A has read every endpoint object.

At this point endpoint A has a complete set of every conversation ID he has every participated in. The next step is to actually recover each of the conversation objects associated with those conversation IDs. To do so, endpoint A iterates through the key/value pair of conversation ID→endpoint ID within the hash. Endpoint A sends a recoverConversation message to the associated endpoint asking that endpoint to send back in reply the conversation object associated with a given conversation ID. When the reply is received, endpoint A adds that conversation to his list of known conversation in his device. He further examines each conversation to see if he is the owner of that conversation, indicated by the owner ID embedded within the conversation object. If he is in fact the owner of that conversation, then endpoint A adds that conversation ID to the list of conversation ID's that he keeps in his endpoint object.

At this point, endpoint A must recover all the messages associated with all the conversations he has recovered. To do so, he first creates an empty hash of message ID→List of (endpoint IDs). That would be, Hash<MessageID, List<EndpointID>>.

Then for each conversation object stored at endpoint A, endpoint A extracts the list of message ID's from that conversation object. If that message is not currently in the hash, then endpoint A adds the message ID and the list of endpoint IDs participating into the conversation to the hash of all messages. This process is repeated for every conversation at which point endpoint A now has a hash of every message that needs to be recovered and a list of endpoints that should contain a copy of that message.

So, to recovery the messages, endpoint A iterates through the hash of messages and for each message endpoint A takes the list of endpoints that have copies of that message. For each endpoint in that list, endpoint A first excludes himself from the list. Then, one at a time, endpoint A asks the counterpart endpoint for a copy of the message with the given message ID by sending that endpoint a recoverMessage command. When endpoint A has received a copy of the message, then endpoint A saves that message away and terminates searching the remainder of the list of endpoints for that particular message. The process then repeated for the next message ID until all the messages have in turn been recovered.

At the end of this process, then endpoint A will have recovered all his counter parts in his social network, all of his conversations and every message that was shared within those conversations.

This system requires a minimum of redundant information to be shared between members of a social network, yet still can recover information from the network. The number of backup peers that any given endpoint chooses to pair with is arbitrary. In our example, we followed endpoint A which only had a single backup partner, however endpoint B had two backup partners. Having more than one partner increases the chance of being able to fully recover information.

One other aspect to the system that was not discussed is the possibility that endpoint A had one or more conversations in which no other endpoint participated. In this case, the conversation object and any associated messages would not exist anywhere else on the network. For this case, endpoint A will send a replicate of those conversations along with their associated messages to his backup counterparts. They will not be visible to the counter part's user (for example endpoint B), but will be stored on the B's device so that A can successfully recover those conversations and messages which are private to only A.

In one embodiment, FIG. 1 depicts a diagram 100 illustrating an example of securely connecting computing devices through the private network 140 as well as storing information securely on the computing devices before or after each transmission. In the example of FIG. 1, the environment includes a first IoT devices 110-1 through an nth client system 110-*n*, private network 140, a smart watch 120, a fitness tracker 130, intelligent voice assistants 150-1 to 150-*n*, personal computers from 160-1, . . . 160-*n*, smartphones from 170-1 to 170-*n*, servers from 180-1, . . . 180-*n*.

In an implementation, the IoT device 110 includes components related to network connectivity. In one implementation, the IoT device 110 includes speaker and/or microphone hardware and software components to enable receipt and execution of speech commands directly on the device. In another implementation, the IoT device 110 does not include a speaker and/or microphone capability to enable receipt and execution of speech commands directly on the device, yet the IoT device is able to communicate with the private network system to enable receipt and execution of speech commands translated to device specific SDK/API commands.

The data, information or content 190 is a complete data set for an exemplary computing device that is always encapsulated using secure objects through the private network that flows through 192 incremental data or full data set. Because the data cannot escape from the private network and has to follow rules within the private network, decentralized distributed backup is performed that allows for a full or partial recovery.

The role of the computing device manufacturers is separated from the use of the computing devices in hosting applications. After purchase, a user of the computing device has control on how to use, configure and communicate using that device. Use of any central services including those from the device manufacturer become optional. In one embodiment, there are one or more aliases associated with each of the computing devices including the IoT devices. The IoT devices integrate with the private network with zero additional programming. Different categories of smart watches 120, fitness trackers 130, personal computers 160 are connected securely and with encryption. The Intelligent voice assistants 150 can be from a variety of providers like Amazon Alexa, Google Home Assistant, Apple HomePod, Microsoft Cortana etc. Smartphones 170 and servers 180 with more computing power, bandwidth and capabilities are also connected. For example, the smallest computing device, i.e. an IoT doorbell ring to the largest computing device, a full-fledged server, are both treated equal in the digital private network world.

A person of ordinary skill in the art would appreciate that by integrating backup and recovery function within the private network system as services that are performed in the background by default, user can have a hassle-free experience. The backup lists of peers are dynamically updated. Changes in the network with regards to time, busy periods, geographic location, available bandwidth and resources are dynamically incorporated to provide for a smart backup algorithm.

Computing devices irrespective of their size, category or applications have powerful computing capabilities in terms of processing power and also have network bandwidth to connect. The systems and methods of modeling private network allow for these computing devices to connect seamless in a secure and encrypted manner after authentication.

Private Network 140 can be different wireless and wired networks available to connect different computer devices including client and server systems. In an implementation, private network 140 is publicly accessible on the internet through secure messaging protocol described herein. In an implementation, private network 140 is inside a secure corporate wide area network. In an implementation, private network 140 allows connectivity of different systems and devices using a computer-readable medium.

The messaging and notification between different components can be implemented using application programming interface (API) calls, extensible markup language ("XML") or Javascript Object Notation ("JSON") config file interfaces between different interfaces, Hypertext Preprocessor (earlier called, Personal Home Page) ("PHP"), Python, Node.js, Java/C++ object-oriented programming or simple web-based tools.

Different components may also implement authentication and encryption to keep the data and the requests secure. Authentication of a device may be accomplished using public/private key, passwords, token, transaction, biometrics, multi-factor authentication or other methods known in the industry. Encryption may use data encryption standard (DES), TripleDES, RSA, Advanced Encryption Standard (AES) or other methods known in the industry.

Figure 2:
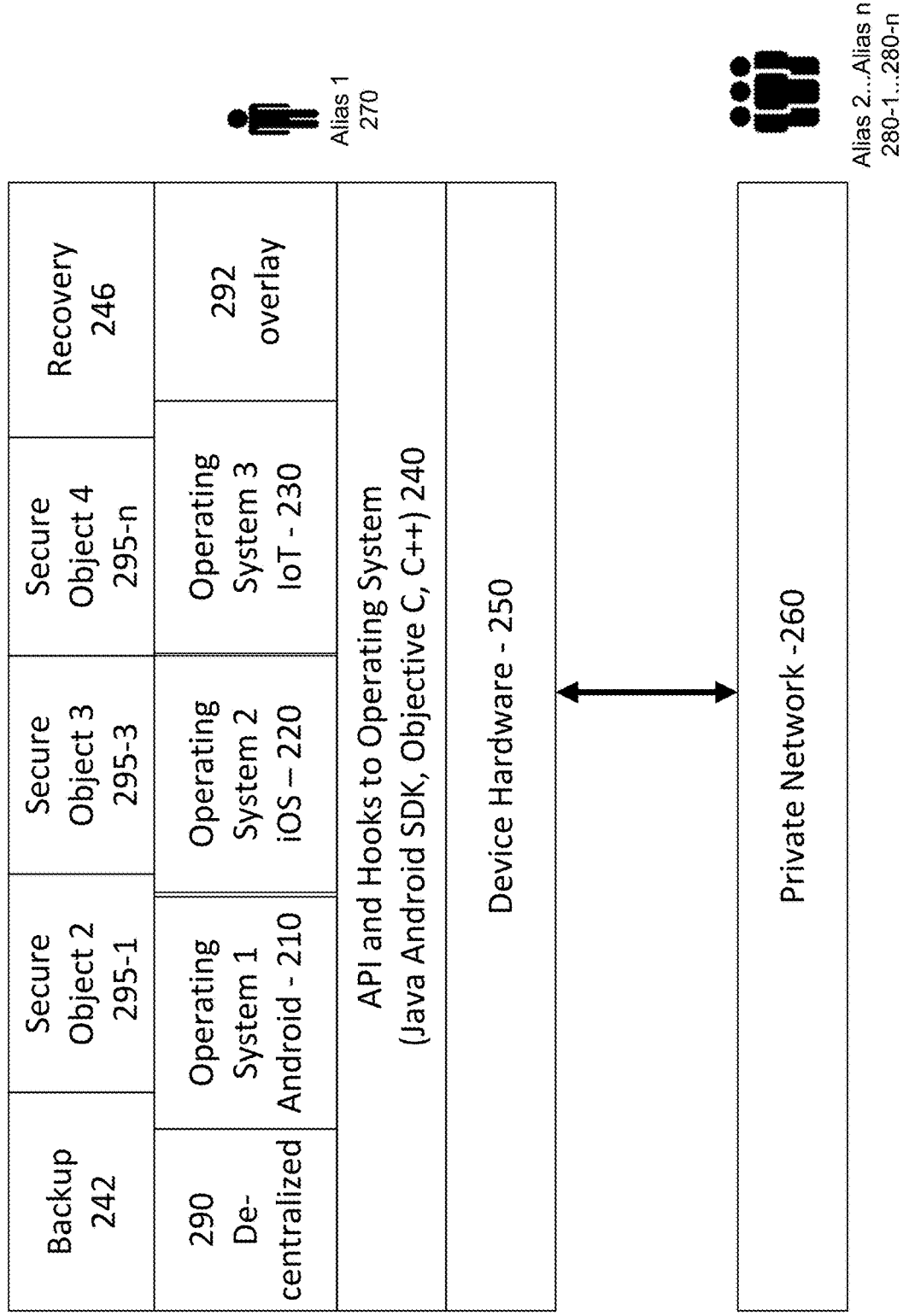
FIG. 2 shows exploded view of a computing device interacting with a private network, according to one embodiment.

FIG. 2 is an exploded view 200 of different versions of an implementation that allow application programming interface, hooks, or overlay network connections in a computing device that hosts different applications. For example, Alias-1 270 is associated with a computing device that may have one or more operating systems including Android 210, iOS 220 or IoT operating system 230. The computing device includes device hardware 250 that can be controlled by the private network API/hooks 240 that are incorporated at a system level on the computing device. In one embodiment, depending on the computing device platform the private network overlay hooks are implemented using Java Android SDK, Objective C, or C++. In one embodiment, any and all communications are controlled using the private network overlay architecture that encompasses the operating system at 290 de-centralization module and 292 overlay network module. In one embodiment, a user can customize the alias to go in and out of the private network overlay architecture mode. The private network 260 includes other trusted alias 2 to alias n i.e. 280-1 to 280-n all of which can communicate with Alias-1 using authenticated, secure and encrypted channels. In one embodiment, the overlay network is based on peer to peer network. In one embodiment, the private network using an overlay network using the existing public network.

In one embodiment, the computing device includes secure object 1, 295-1, secure object 2 295-2, . . . secure object n 295-n from the private network. A person of ordinary skill in the art would understand that information of or related to the private networks exists only within secure objects that interact securely with the different applications. These secure objects follow the rules of the private network and also comply with associated life cycle and distribution policies. These secure objects interact seamless within different applications while complying with their inherent rules and policies. The secure objects encapsulate both system information as well as user created content. Backup module 242 operates with the secure objects to dynamically select a buddy list that is a subset of the trusted alias list 280-1 to 280-n from the network to perform backups. Backup module can be customized with different settings by the user, operated at higher level of backup operations for more sensitive data and minimal levels for casual data, as well as perform periodic full-update with incremental updates on a more frequent basis. Recovery module 246 can operate to recover partial or full state of the computing device based on the need at a given time.

Figure 3:
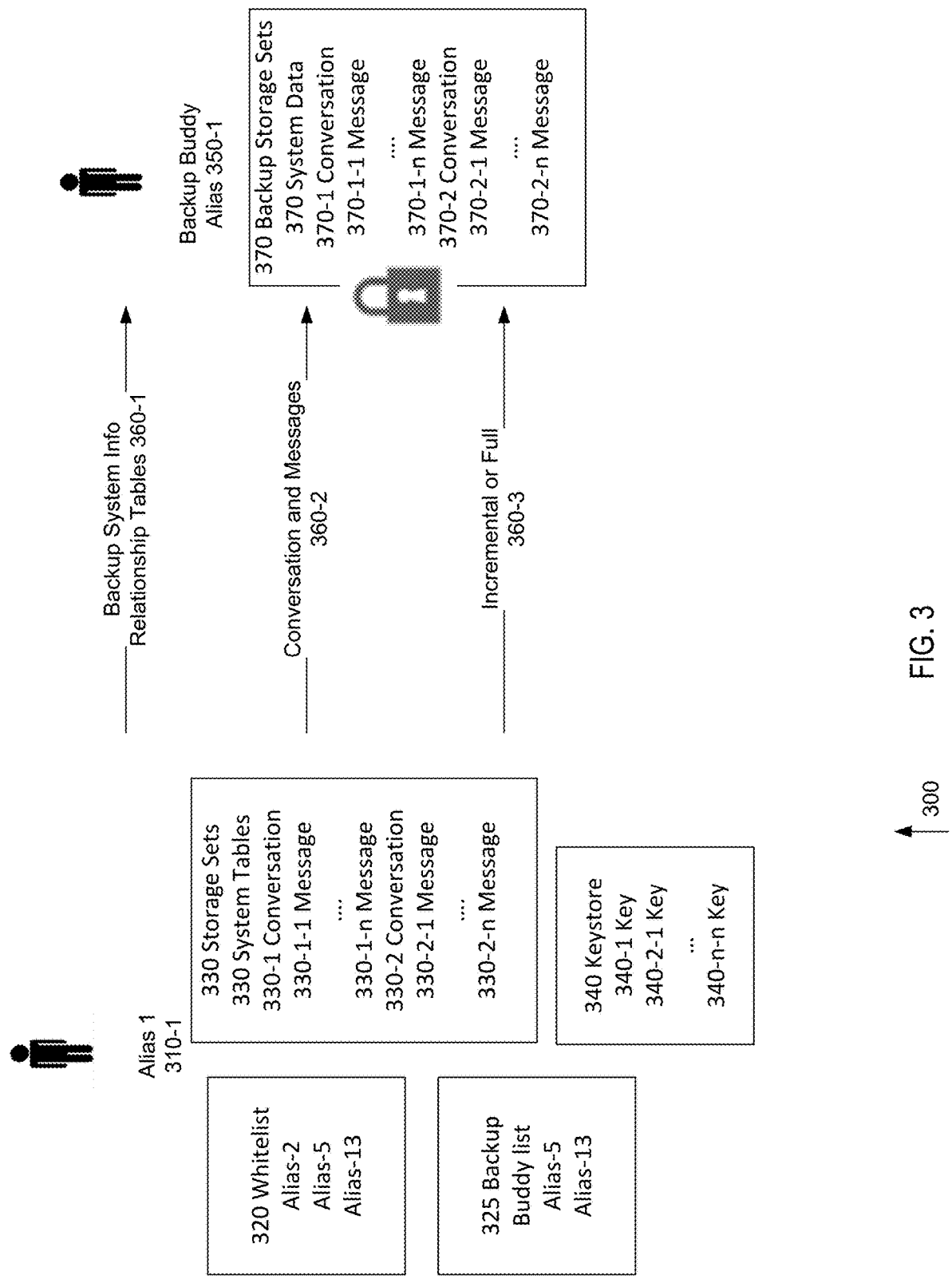
FIG. 3 is staged view of actions, according to one embodiment.

FIG. 3 outlines 300 showing actions related to distributed backup between an alias 1 at 310-1 and its backup buddy at Alias 350-1. Whitelist 320 includes the trusted relationships already established at Alias-1. For example, Alias-2, Alias-5, Alias-13 are listed on the whitelist. Alias 350-1 can be anyone of them. 325 shows a backup buddy list that is dynamically selected by the system by using the broader whitelist and is a subset of the whitelist. A person of ordinary skill in the system would understand that for a very small network, the whitelist and the backup buddy list may be the same or equal. 330 Storage sets include sets of data that includes system relationship tables and different conversations 330-1, 330-2, 330-n that encapsulate different messages 330-1-1 to 330-n-n. Each of these data objects have an associated key with the key store 340 that stores multiple keys 340-1, 340-2-1, . . . 340-n-n.

At the outset, Alias-1 selects a buddy list and backups its full system information 360-1 with relationship tables. The data backed up is not decrypted. The keys associated with the backup are stored at the same or another buddy using another password. The system at alias 350-1 stores the backup information without the ability to decode it. Only the alias-1 can decode the data. Optionally depending on backup levels settings customized by the private network by the user or an administrator, the conversation and messages 360-2 are also sent for backup. After the initial setup, periodic full at a longer time period and more frequent incremental updates are sent out 360-3. The Backup storage sets 370 includes 370 system data including relationship tables, conversations 370-1 to 370-n and messages 370-1-1 to 370-n-n.

Figure 4:
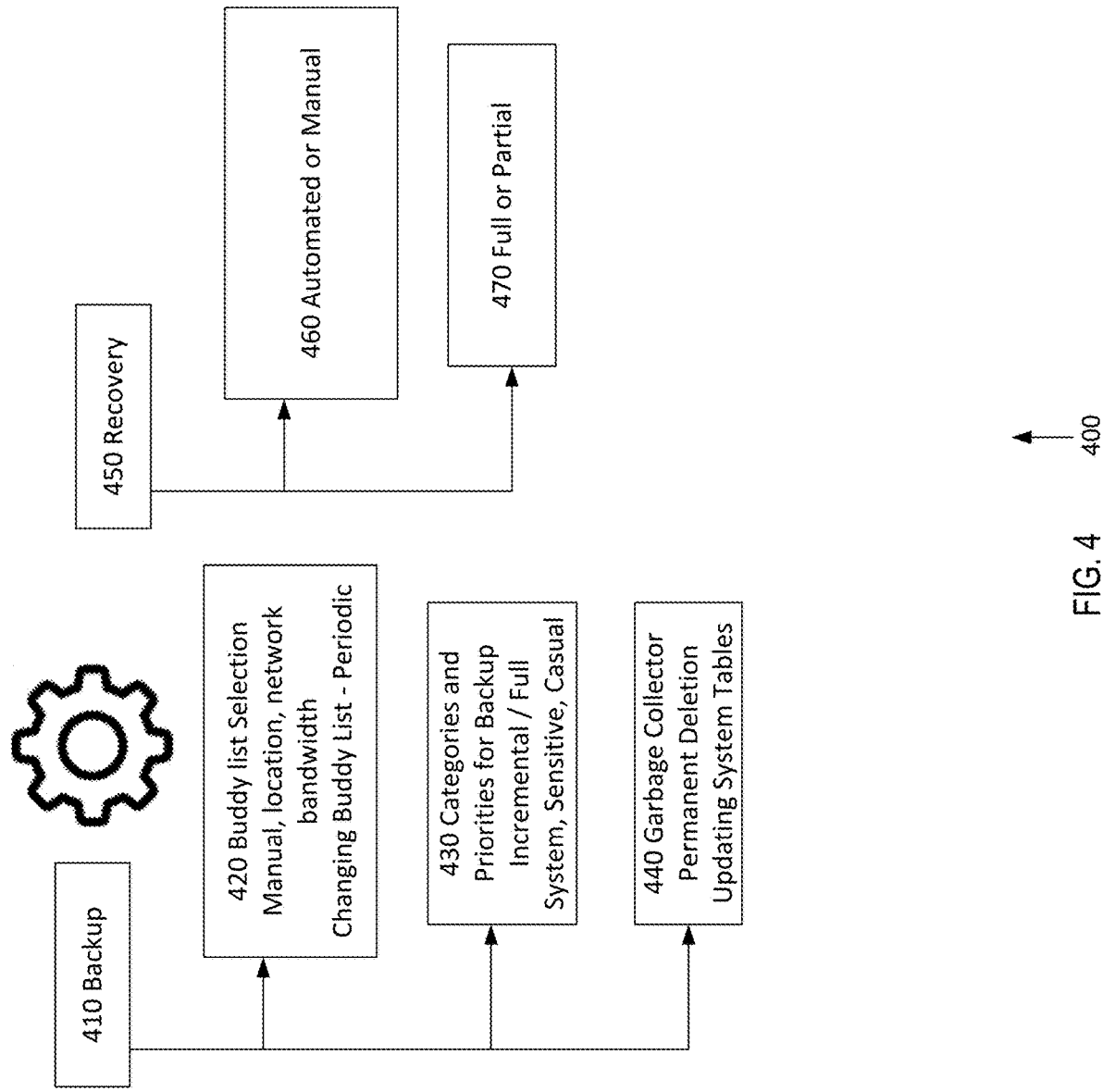
FIG. 4 is a view of different categories of backup and recovery, according to one embodiment.

FIG. 4 with 400 shows different categories of backup settings and recovery options for the private network. 410 Backup settings include 420 Buddy list selection options to manually or automatically change the buddy list. Selection can be based on location of the buddy alias, network bandwidth and past historical reliability. The system may automatically update the buddy list periodically to keep the backups dynamically fresh, at different locations and less vulnerable for attacks. At 430, the backup settings include options to select categories of information that can is selected for backup. In one embodiment, the system information including relationship tables are always selected by default for backup. In one embodiment, a user cannot disable backup of system information including relationship tables. Other categories may include topic based conversation selections, time period based i.e. more current data is selected for past 2 months or 1 year etc., location based i.e. related to my work place. A user or administrator can assign different priorities and backup levels for the selected data. High priority data may be selected for back up on 3 or more devices. More casual data can be selected for backup on one additional device. 440 is garbage collector settings that allow for permanent deletion and updating of system tables and recapturing storage space to keep the devices current on the private network.

450 Recovery module keeps in any data is lost or become corrupt. 460 shows that recovery can be automatic or manual. If the system detects that some relationship tables are corrupt, those may be automatically recovered without any intervention from the user. If an entire computing device is lost, the entire state may be recovered automatically or manually by selecting parts of or all of the data sets. Module 470 shows the recovery options of allowing full or partial recovery. Since the data sets are stored in secure objects in multiple locations, customization of backup and recovery is allowed at that same level of micro-details.

Figure 5:
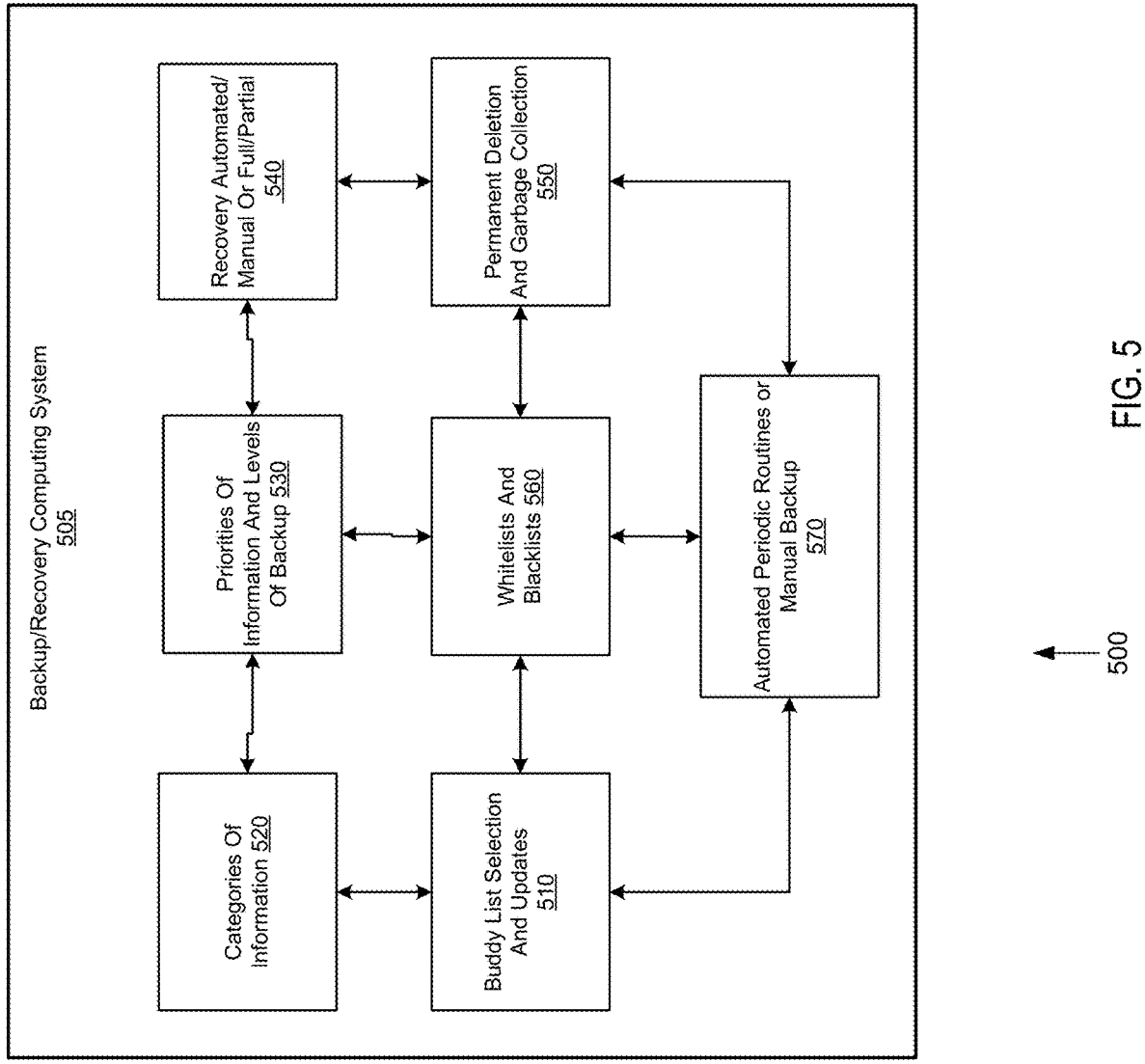
FIG. 5 is an exploded view of backup and recovery computing device, according to one embodiment.

FIG. 5 with 500 shows an exploded view of backup or recovery for computing device 505 and the modules incorporated. At 570, the module is triggered with initial setup that is automated with periodic routes, manually instigated or triggered whenever data is updated. At 510, buddy list selection and updates occur that are selected from the broader and already established trusted whitelists. The selected buddy list is periodically updated. At 520, module is used to select categories of information that need to be backed up. Categories could be based on system related, time-based, sensitive of topics, geographic etc. At 530, priorities of information is customized to allow for associated levels of backup. Sensitive, important or critical data is sent for backup more often, more frequently at 3 or more different devices. At 540, module for recovery is automated, manually triggered for full or partial levels of data sets. At 550, permanent deletion of data occurs with garbage collection that resets system tables associated with the deleted tables. At 560, whitelist and blacklists are maintained. A computing device alias that is compromised is added to blacklist.

Figure 6:
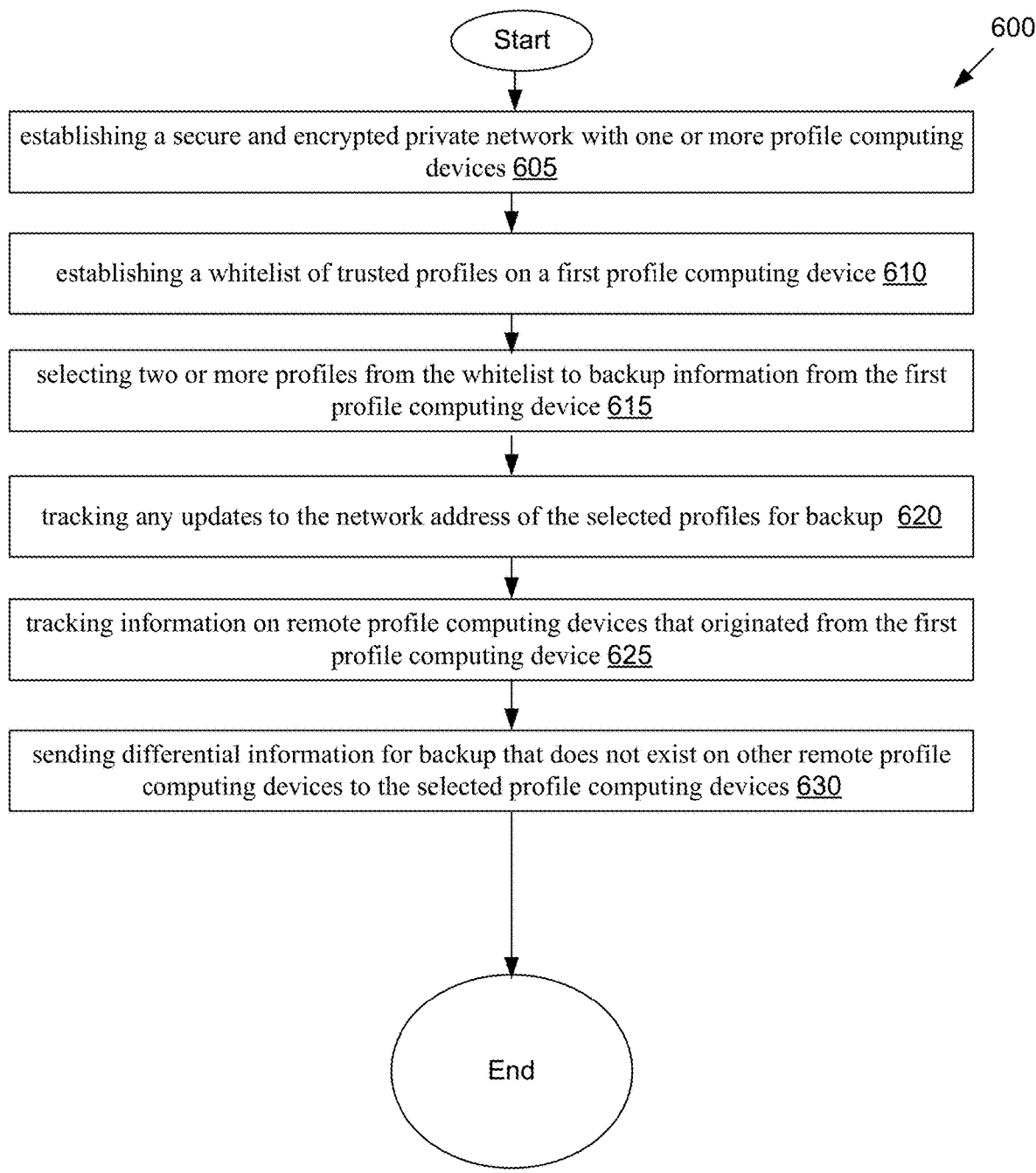
FIG. 6 shows a flowchart illustrating an example of a method of distributed backup on a private network.

FIG. 6 depicts a flowchart 600 illustrating an example of a method of distributed backup on a private network. The flowchart 600 is discussed in conjunction with the environment shown in the diagram 100 in FIG. 1. At block 605, begins with establishing a secure and encrypted private network with one or more profile computing devices. At block 610, establishing a whitelist of trusted profiles on a first profile computing device. At block 615, selecting two or more profiles from the whitelist to backup information from the first profile computing device. At block 620, tracking any updates to the network address of the selected profiles for backup. At block 625, tracking information on remote profile computing devices that originated from the first profile computing device. At block 630, sending differential information for backup that does not exist on other remote profile computing devices to the selected profile computing devices. A person of ordinary skill in the art would appreciate that by following the steps outlined above that is inbuilt into the computing device, the private network enforces automatic backup and recovered with customized control at the data level that is implemented network-wide.

In a broad embodiment, the invention is systems and methods of distributed backup and recovery that is seamless and hassle-free on a private network allows a higher level of security of data distribution on the private network because when at risk, the data can be recovered from the distributed network peers.

Figure 7:
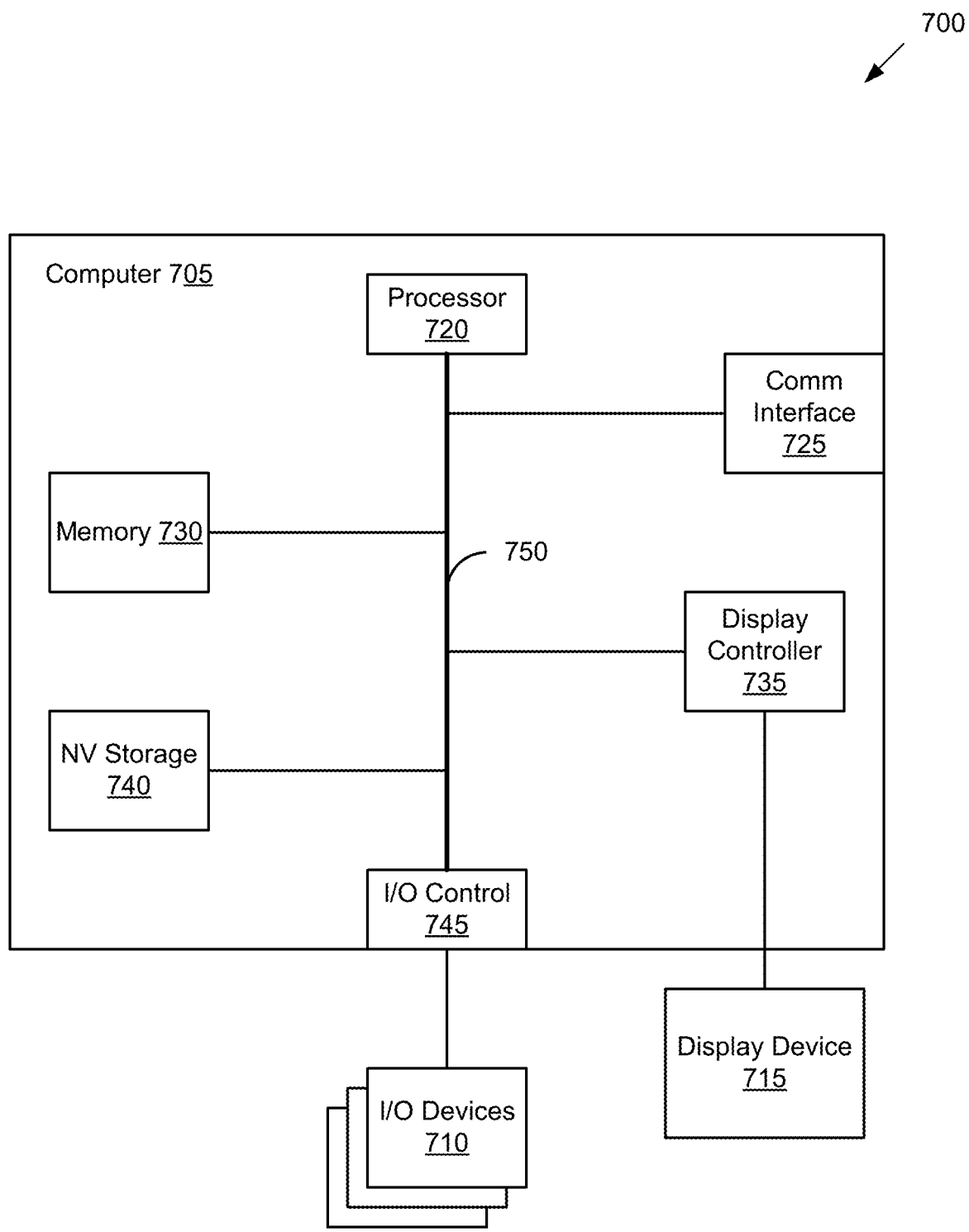
FIG. 7 is a schematic diagram of exemplary computing devices that can be used to implement the methods and systems disclosed herein, according to one embodiment.

FIG. 7 is a schematic diagram of computing device 700 that can be used to implement the methods and systems disclosed herein, according to one or more embodiments. FIG. 7 is a schematic of a computing device 700 that can be used to perform and/or implement any of the embodiments disclosed herein. In one or more embodiments, IoT device 110, SDK/API 120, Speak-to-IoT system 130, voice assistants 150, user end devices with mobile apps 170 or 180 of FIG. 1 may be the computing device 700.

The computing device 700 may represent various forms of digital computers, such as laptops, desktops, workstations, personal digital assistants, servers, blade servers, mainframes, and/or other appropriate computers. The computing device 700 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

FIG. 7 shows an example of a computing device 700 on which techniques described here can be implemented. The computing device 700 can be a conventional computer system that can be used as a client computer system, such as a wireless client or a workstation, or a server computer system. The computing device 700 includes a computer 705, I/O devices 710, and a display device 715. The computer 705 includes a processor 720, a communications interface 725, memory 730, display controller 735, non-volatile storage 740, and I/O controller 745. The computer 705 may be coupled to or include the I/O devices 710 and display device 715.

The computer 705 interfaces to external systems through the communications interface 725, which may include a modem or network interface. It will be appreciated that the communications interface 725 can be considered to be part of the computing device 700 or a part of the computer 705. The communications interface 725 can be an analog modem, integrated services for digital networks ("ISDN") modem, cable modem, token ring interface, satellite transmission interface (e.g. "direct personal computer" also known as "direct PC"), or other interfaces for coupling a computer system to other computer systems.

The processor 720 may be, for example, a conventional microprocessor such as an Intel Pentium microprocessor or Motorola power PC microprocessor. The memory 730 is coupled to the processor 720 by a bus 750. The memory 730 can be Dynamic Random Access Memory (DRAM) and can also include Static RAM (SRAM). The bus 750 couples the processor 720 to the memory 730, also to the non-volatile storage 740, to the display controller 735, and to the I/O controller 745.

The I/O devices 710 can include a keyboard, disk drives, printers, a scanner, and other input and output devices, including a mouse or other pointing device. The display controller 735 may control in the conventional manner a display on the display device 715, which can be, for example, a cathode ray tube (CRT) or liquid crystal display (LCD). The display controller 735 and the I/O controller 745 can be implemented with conventional well-known technology.

The non-volatile storage 740 is often a magnetic hard disk, an optical disk, or another form of storage for large amounts of data. Some of this data is often written, by a direct memory access process, into memory 730 during execution of software in the computer 705. One of skill in the art will immediately recognize that the terms "machine-readable medium" or "computer-readable medium" includes any type of storage device that is accessible by the processor 720 and also encompasses a carrier wave that encodes a data signal.

The computing device 700 is one example of many possible computer systems that have different architectures. For example, personal computers based on an Intel microprocessor often have multiple buses, one of which can be an I/O bus for the peripherals and one that directly connects the processor 720 and the memory 730 (often referred to as a memory bus). The buses are connected together through bridge components that perform any necessary translation due to differing bus protocols.

Network computers are another type of computer system that can be used in conjunction with the teachings described here. Network computers do not usually include a hard disk or other mass storage, and the executable programs are loaded from a network connection into the memory 730 for execution by the processor 720. A Web TV system, which is known in the art, is also considered to be a computer system, but it may lack some of the components shown in FIG. 7, such as certain input or output devices. A typical computer system will usually include at least a processor, memory, and a bus coupling the memory to the processor.

Though FIG. 7 shows an example of the computing device 700, it is noted that the term "computer system," as used here, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 7.

The memory can include, by way of example but not limitation, random access memory (RAM), such as dynamic RAM (DRAM) and static RAM (SRAM). The memory can be local, remote, or distributed. As used here, the term "computer-readable storage medium" is intended to include only physical media, such as memory. As used here, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory here. Even when software is moved to the memory for execution, the processor will typically make use of hardware registers to store values associated with the software, and local cache that, ideally, serves to speed up execution. As used here, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

Figure 8:
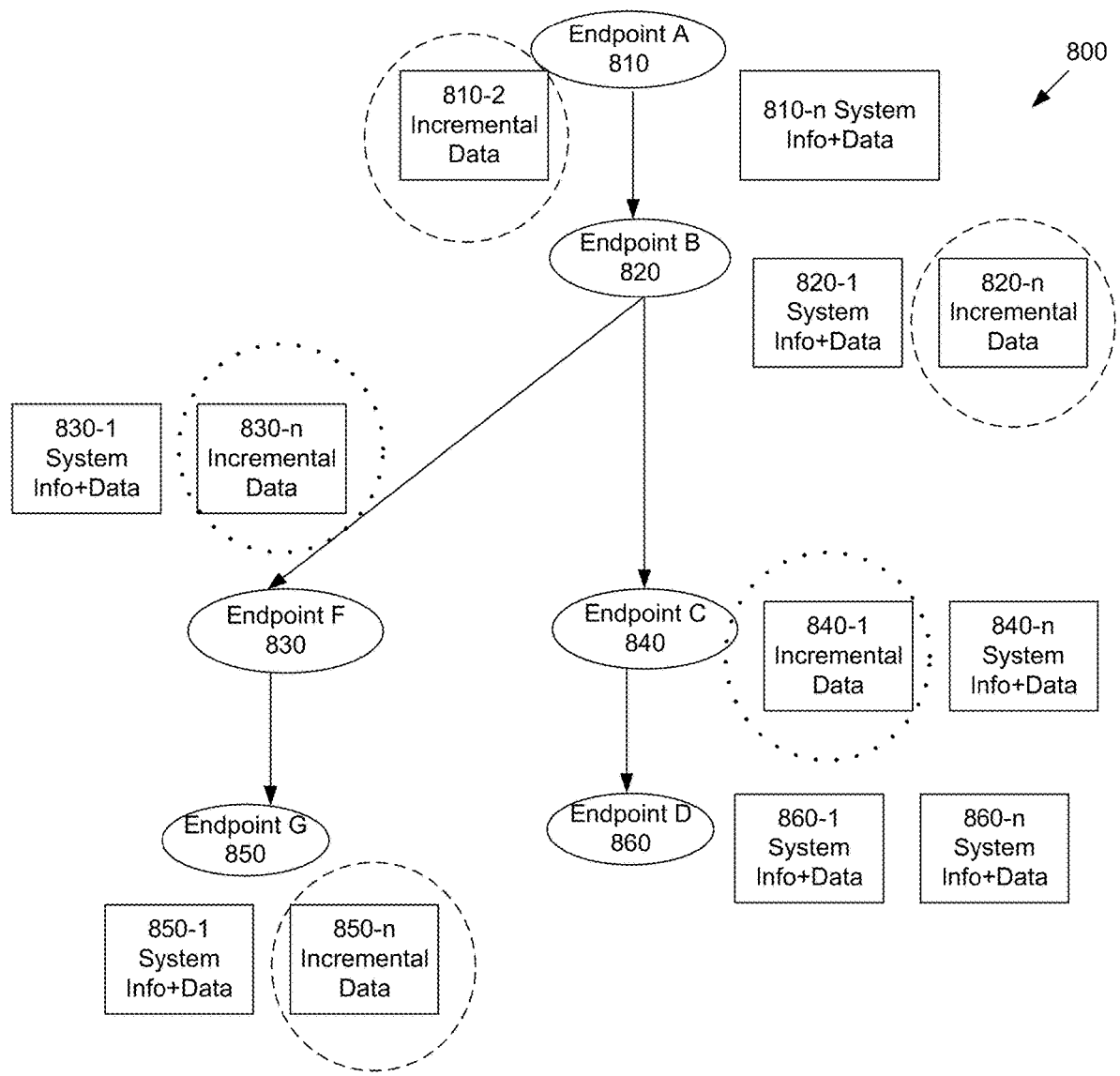
FIG. 8 is a staged level diagram illustrating data and trigger flow between different devices on the private network.

FIG. 8 shows different stages 800 with regards to different computing devices depicted as endpoints having different types of system information plus user created content and subsequent incremental data that are received throughout the private network. For example, in one embodiment, incremental data at 810-2 is related to conversation 1. Copies of the same conversation object are also with 820-$n$ and 850-$n$ as marked with the dashed circle. An action triggered for backup of conversation object 1 will be synchronized through the network with an update for all the copies of that particular conversation object 1. For example, if 820-$n$ sends a message object to 810-2, that message object will also be added to the conversation object with alias 850-$n$. When the source or originator of message object from 820-$n$ receives a trigger of backup, all the corresponding copies of the data objects are updated network wide. If the originator of the conversation object, alias 810-2 triggers data recovery for the conversation, one or more of the of the related conversation objects including all of the encompassed message objects network wide will be used for recovery.

In another example, alias 830-$n$ and alias 840-1 have the same conversation object with incremental data. Endpoints 810 to 860 are different aliases operating on different computing devices on the private network. The system information plus user created content that are stored locally on an end point are shown in square boxes with the same alias number near the endpoints. Alias 830-$n$ can make a copy of the conversation object and then request backup of the original conversation object. Since the original conversation object originated from 830-$n$, the alias has full control on making copies including retaining a duplicate copy and then requesting a backup of all of the copies network wide. Similarly, while alias 840-1 cannot make a duplicate copy of the entire conversation object for itself, the alias can make a duplicate copy of all of the messages that originated from it. Alias 840-1 may have a default rule to make a copy of all of the system information plus user created content that were sourced by it before backing up conversation objects triggered by others. A person of ordinary skill in the art would appreciate that the enforcing automatic backup allows each user to individually customize its behavior and triggers and provides added robustness and resilience network-wide. Similar to a real world situation, the originator of the information always has control in the digital world of the private network.

A person of ordinary skill in the art would appreciate that distributed backup and recovery on the private network allows for network wide control and flexibility by providing a higher level of security that allows for controlling data at a microlevel with secure objects. Either an end-user or a computing device with artificial intelligence modules can control through the use of aliases equivalent functions to control the life cycle and distribution of data that originates from that alias.

Several components described here, including clients, servers, and engines, can be compatible with or implemented using a cloud-based computing system. As used here, an overlay network including, for example, a peer to peer network, is a system that provides computing resources, software, and/or information to client systems by maintaining de-centralized services and resources that the client systems can access over a communications interface, such as a network. A person of ordinary skill in the art would understand that different modules or components described herein could be implemented using a cloud-based computing system. Such systems can involve a subscription for services or use a utility pricing model. Users can access the protocols of the private network through a web browser or other container application located on their client system.

The invention disclosure describes techniques that those of skill in the art can implement in numerous ways. For instance, those of skill in the art can implement the techniques described here using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used here, the term 'processor' refers to one or more devices, circuits, and/or processing cores configured to process data, such as computer program instructions.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described here relate to apparatus for performing the operations. The apparatus can be specially constructed for the required purposes, or it can comprise a general-purpose computer selectively activated or reconfigured by a computer program stored in the computer. Such a computer program may be stored in a computer-readable storage medium, such as, but not limited to, read-only memories (ROMs), random access memories (RAMS), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order. The structures and modules in the figures may be shown as distinct and communicating with only a few specific structures and not others. The structures may be merged with each other, may perform overlapping functions, and may communicate with other structures not shown to be connected in the figures.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tapes, disks, integrated circuits, and servers. The instructions are operational when executed by the processor to direct the processor to operate in accord with some embodiments. Those skilled in the art are familiar with instructions, processor(s), and storage medium.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The structures and modules in the figures may be shown as distinct and communicating with only a few specific structures and not others. The structures may be merged with each other, may perform overlapping functions, and may communicate with other structures not shown to be connected in the figures.

The invention claimed is:

1. A method of distributed backup on a private network, comprising:
   establishing a secure and encrypted private network with one or more profile computing devices;
   establishing a whitelist of trusted profiles on a first profile computing device;
   selecting two or more profiles from the whitelist that are remote and separate to backup information from the first profile computing device;
   tracking any updates to a network address of the selected profiles for backup;
   tracking information that originated from the first profile computing device, on the selected profile computing devices;
   sending differential information for backup that does not exist on the selected profile computing devices to the selected profile computing devices;
   wherein the selected profile computing devices have backup information to allow for recovery of the first profile computing device.

2. The method of claim 1, further comprising:
   customizing the selected profiles for backup using one or more of the following: manually, based on available bandwidth or storage, or geographic location.

3. The method of claim 1, further comprising:
   periodically updating the selected profiles for backup.

4. The method of claim 1, further comprising:
   customizing the categories of information that is selected for backup.

5. The method of claim 1, further comprising:
   selecting whitelists information for backup.

6. The method of claim 1, further comprising:
   selecting profiles for backup using out of band factors including paying for storage services on another profile computing device.

7. The method of claim 1, further comprising:
   customizing the number of profile computing devices selected for backup.

8. The method of claim 1, further comprising:
   deleting all the secure objects on all profile computing devices on the private network other than the first profile computing device.

9. The method of claim 1, further comprising:
   recovering partial information from one of the selected profile computing devices with backup information.

10. The method of claim 9, further comprising:
    recovering all information for the first computing devices using one or more of the selected profile computing devices with backup information.

11. A system of distributed backup on a private network, comprising:
    a secure and encrypted private network with one or more profile computing devices configured to:
    establish a whitelist of trusted profiles on a first profile computing device;
    select two or more profiles from the whitelist that are remote and separate to backup information from the first profile computing device;
    track any updates to a network address of the selected profiles for backup;
    track information that originated from the first profile computing device, on the selected profile computing devices;
    send differential information for backup that does not exist on the selected profile computing devices to the selected profile computing devices;
    wherein the selected profile computing devices have backup information to allow for recovery of the first profile computing device.

12. The system of claim 11, wherein the private network is further configured to:
    customize the selected profiles for backup using one or more of the following: manually, based on available bandwidth or storage, or geographic location.

13. The system of claim 11, wherein the private network is further configured to:
    periodically update the selected profiles for backup.

14. The system of claim 11, wherein the private network is further configured to:
    customize the categories of information that is selected for backup.

15. The system of claim 11, wherein the private network is further configured to:
    select whitelists information for backup.

16. The system of claim 11, wherein the private network is further configured to:
    select profiles for backup using out of band factors including paying for storage services on another profile computing device.

17. The system of claim 11, wherein the private network is further configured to:
    customize the number of profile computing devices selected for backup.

18. The system of claim 11, wherein the private network is further configured to:
    delete all the secure objects on all profile computing devices on the private network other than the first profile computing device.

19. The system of claim 11, wherein the private network is further configured to:
    recover partial information from one of the selected profile computing devices with backup information.

20. The system of claim 19, wherein the private network is further configured to:
    recover all information for the first computing devices using one or more of the selected profile computing devices with backup information.

* * * * *